United States Patent
Tokutake et al.

(10) Patent No.: US 11,702,944 B2
(45) Date of Patent: Jul. 18, 2023

(54) HIGH-TEMPERATURE COMPONENT, PRODUCTION METHOD FOR HIGH-TEMPERATURE COMPONENT, AND FLOW RATE CONTROL METHOD

(71) Applicant: Mitsubishi Power, Ltd., Kanagawa (JP)

(72) Inventors: Taro Tokutake, Tokyo (JP); Ryuta Ito, Tokyo (JP); Koichiro Iida, Tokyo (JP); Yoshinori Wakita, Tokyo (JP); Shuji Tanigawa, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 163 days.

(21) Appl. No.: 17/432,211

(22) PCT Filed: Feb. 19, 2020

(86) PCT No.: PCT/JP2020/006527
§ 371 (c)(1),
(2) Date: Aug. 19, 2021

(87) PCT Pub. No.: WO2020/202863
PCT Pub. Date: Oct. 8, 2020

(65) Prior Publication Data
US 2022/0049612 A1 Feb. 17, 2022

(30) Foreign Application Priority Data
Mar. 29, 2019 (JP) .................. 2019-065811

(51) Int. Cl.
*F01D 9/04* (2006.01)
*F01D 25/12* (2006.01)
*B33Y 80/00* (2015.01)

(52) U.S. Cl.
CPC .............. *F01D 9/04* (2013.01); *F01D 25/12* (2013.01); *B33Y 80/00* (2014.12);
(Continued)

(58) Field of Classification Search
CPC ............. F01D 9/04; F01D 11/08; F01D 25/12
See application file for complete search history.

(56) References Cited

U.S. PATENT DOCUMENTS 6,464,460 B2 * 10/2002 El-Nashar ............... F01D 5/187
416/191
7,131,818 B2 * 11/2006 Cunha ..................... F01D 5/189
415/115

(Continued)

FOREIGN PATENT DOCUMENTS

| CN | 1800588 | 7/2006 |
| CN | 103953396 | 7/2014 |

(Continued)

OTHER PUBLICATIONS

International Search Report dated Apr. 21, 2020 in International Application No. PCT/JP2020/006527.

(Continued)

*Primary Examiner* — Long T Tran
(74) *Attorney, Agent, or Firm* — Wenderoth, Lind & Ponack, L.L.P.

(57) ABSTRACT

A high-temperature component including a plurality of cooling passages through which the cooling medium can flow, a header connected to respective downstream ends of the plurality of cooling passages, and one or more outlet passages for discharging the cooling medium flowing into the header to outside of the header. The one or more outlet passages are less in number than the plurality of cooling passages. Respective minimum flow passage cross-sectional areas of the one or more outlet passages are not less than respective flow passage cross-sectional areas of the plurality of cooling passages in a connection between the header and the cooling passages. A sum of the respective minimum flow passage cross-sectional areas of the one or more outlet passages is less than a sum of the respective flow passage (Continued)

cross-sectional areas of the plurality of cooling passages in the connection between the header and the cooling passages.

17 Claims, 6 Drawing Sheets

(52) U.S. Cl.
CPC ...... *F05D 2230/10* (2013.01); *F05D 2230/31* (2013.01); *F05D 2250/37* (2013.01); *F05D 2260/232* (2013.01); *F05D 2300/516* (2013.01)

(56) References Cited

U.S. PATENT DOCUMENTS

| | | | | |
|---|---|---|---|---|
| 8,057,177 | B2* | 11/2011 | Brittingham | F01D 5/225 |
| | | | | 416/189 |
| 8,317,461 | B2* | 11/2012 | Tholen | F01D 11/08 |
| | | | | 415/173.1 |
| 8,650,521 | B1 | 2/2014 | Ordonez Ruiz et al. | |
| 10,294,799 | B2* | 5/2019 | Spangler | F01D 5/186 |
| 10,738,651 | B2* | 8/2020 | VanTassel | F01D 9/065 |
| 2003/0131980 | A1* | 7/2003 | DeMarche | F01D 11/24 |
| | | | | 165/169 |
| 2005/0173388 | A1 | 8/2005 | Lavers et al. | |
| 2006/0093480 | A1 | 5/2006 | Cunha et al. | |
| 2006/0140753 | A1 | 6/2006 | Romanov et al. | |
| 2007/0154312 | A1* | 7/2007 | Neuhoff | F01D 5/187 |
| | | | | 416/97 R |
| 2012/0057968 | A1 | 3/2012 | Lee et al. | |
| 2014/0099476 | A1 | 4/2014 | Subramanian et al. | |
| 2014/0205454 | A1 | 7/2014 | Giovannetti et al. | |
| 2015/0059357 | A1 | 3/2015 | Morgan et al. | |
| 2017/0175574 | A1* | 6/2017 | Benjamin | F01D 25/12 |
| 2018/0320595 | A1 | 11/2018 | Sato et al. | |
| 2019/0040747 | A1* | 2/2019 | Izumi | F01D 5/20 |
| 2019/0218913 | A1* | 7/2019 | Sen | F01D 1/26 |
| 2019/0368365 | A1* | 12/2019 | VanTassel | F01D 11/08 |
| 2019/0368377 | A1* | 12/2019 | VanTassel | F01D 11/10 |

FOREIGN PATENT DOCUMENTS

| | | |
|---|---|---|
| CN | 104684667 | 6/2015 |
| JP | 2003-214184 | 7/2003 |
| JP | 2006-132536 | 5/2006 |
| JP | 2008-274774 | 11/2008 |
| JP | 2013-240845 | 12/2013 |
| JP | 2014-139431 | 7/2014 |
| JP | 2015-48848 | 3/2015 |
| JP | 2016-502589 | 1/2016 |
| WO | 2017/077955 | 5/2017 |

OTHER PUBLICATIONS

Office Action dated Mar. 10, 2021 in Taiwanese Application No. 109105683.
International Preliminary Report on Patentability dated Oct. 14, 2021 in International Application No. PCT/JP2020/006527, with English translation.
Office Action dated Apr. 18, 2023 in counterpart CN Application No. 202080013401.4.

* cited by examiner

A3 cross-sectional view

FIG. 4

A4-A4 cross-sectional view

HIGH-TEMPERATURE COMPONENT, PRODUCTION METHOD FOR HIGH-TEMPERATURE COMPONENT, AND FLOW RATE CONTROL METHOD

TECHNICAL FIELD

The present disclosure relates to a high-temperature component, a production method for the high-temperature component, and a flow rate control method.

BACKGROUND

For example, in a machine such as a gas turbine inside of which a high-temperature working gas flows, components forming the machine include a high-temperature component that needs to be cooled by a cooling medium. As a cooling structure of the high-temperature component, a structure is known in which the high-temperature component is cooled by causing cooling air to flow through a plurality of delivery channels (cooling passages) allowing the cooling air to flow inside the component (see Patent Document 1, for example).

CITATION LIST

Patent Literature

Patent Document 1: JP2015-48848A

SUMMARY

Technical Problem

In a machine such as a gas turbine operated by a high-temperature working gas, a loss of heat by cooling generally leads to a decrease in thermal efficiency of the machine. Thus, it is desirable that a high-temperature component is efficiently cooled with as few cooling media as possible. Therefore, it is preferable that a flow passage cross-sectional area in a cooling passage is not large more than necessary.

However, if the flow passage cross-sectional area is small, dimension accuracy of the cooling passage tends to decrease due to a production constraint of the high-temperature component, which may decrease accuracy of the low rate of cooling air in the cooling passage.

If accuracy of the flow rate of the cooling air in the cooling passage is decreased, and the flow rate of the cooling air is higher than a design flow rate, heat is taken away by the cooling air more than necessary, which may decrease thermal efficiency of the machine.

Moreover, if the flow rate of the cooling air is lower than the design flow rate, the high-temperature component may be damaged by deficient cooling.

In view of the above, an object of at least one embodiment of the present invention is to provide the high-temperature component capable of avoiding deficiency in cooling capacity while suppressing excess cooling.

Solution to Problem (1) A high-temperature component according to at least one embodiment of the present invention is a high-temperature component which is used for a turbomachinery and needs to be cooled by a cooling medium, the component including a plurality of cooling passages through which the cooling medium can flow, a header connected to respective downstream ends of the plurality of cooling passages, and one or more outlet passages for discharging the cooling medium flowing into the header to outside of the header. The one or more outlet passages are less in number than the plurality of cooling passages. Respective minimum flow passage cross-sectional areas of the one or more outlet passages are not less than respective flow passage cross-sectional areas of the plurality of cooling passages in a connection between the header and the cooling passages. A sum of the respective minimum flow passage cross-sectional areas of the one or more outlet passages is less than a sum of the respective flow passage cross-sectional areas of the plurality of cooling passages in the connection between the header and the cooling passages.

In a case where the flow rate of the cooling medium flowing through each of the plurality of cooling passages is decided by each of the flow passage cross-sectional areas of the plurality of cooling passages, if the flow passage cross-sectional area is small, dimension accuracy of the cooling passages tends to decrease due to a production constraint of the high-temperature component as described above, which may decrease accuracy of the flow rate of the cooling medium in the cooling passages.

By contrast, with the above configuration (1), since the sum of the respective minimum flow passage cross-sectional areas of the one or more outlet passages is less than the sum of the respective flow passage cross-sectional areas of the plurality of cooling passages in the connection between the header and the cooling passages, it is possible to define the flow rate of the cooling medium in the plurality of cooling passages by the minimum flow passage cross-sectional areas of the cooling passages. Thus, in each of the plurality of cooling passages, the flow passage cross-sectional area need not be decreased more than necessary to control the flow rate of the cooling medium, improving dimension accuracy of the cooling passages and making it possible to suppress a variation in flow rate of the cooling medium among the plurality of cooling passages. Therefore, it is possible to avoid deficiency in cooling capacity while suppressing excess cooling.

Further, with the above configuration (1), since the respective minimum flow passage cross-sectional areas of the one or more outlet passages are not less than the respective flow passage cross-sectional areas of the plurality of cooling passages in the connection between the header and the cooling passages, dimension accuracy of the outlet passage is easily ensured, and blockage in the outlet passage by a foreign substance hardly occurs.

Furthermore, with the above configuration (1), since the one or more outlet passages are less in number than the plurality of cooling passages, in terms of management of the flow rate of the cooling medium, it is possible to reduce a portion where accuracy of the flow passage cross-sectional area, that is, dimension accuracy of the passage should be ensured, and to suppress a production cost of the high-temperature component.

(2) In some embodiments, in the above configuration (1), a separation distance between an upstream inner wall and a downstream inner wall of the header is at least one time and at most three times greater than an equivalent diameter of a region where the flow passage cross-sectional area of the outlet passage is minimum.

If the upstream inner wall, that is, connection positions between the header and the respective downstream ends of the plurality of cooling passages, and the downstream inner wall, that is, connection positions between the header and respective upstream ends of the one or more outlet passages are too close to each other, a difference in flow rate of the cooling medium increases between the cooling passage whose distance between the downstream end of the cooling passage and the upstream end of the outlet passage is small, and the cooling passage whose distance between the downstream end and the upstream end is large.

By contrast, with the above configuration (2), since the upstream inner wall, that is, the connection positions between the header and the respective downstream ends of the plurality of cooling passages, and the downstream inner wall, that is, the connection positions between the header and the respective upstream ends of the one or more outlet passages are separated from each other by at least one time greater than the above-described equivalent diameter, it is possible to suppress the variation in flow rate of the cooling medium among the plurality of cooling passages.

Moreover, since the respective downstream ends of the plurality of cooling passages are connected to the header, a space volume in the header increases, and the flow velocity of the cooling medium in the header decreases, decreasing a heat transfer coefficient to the cooling medium. Consequently, the cooling capacity may be decreased in the header, and thus it is preferable that the separation distance between the upstream inner wall and the downstream inner wall is not large.

In this regard, with the above configuration (2), since the separation distance between the upstream inner wall and the downstream inner wall is at most three times greater than the above-described equivalent diameter, it is possible to suppress occurrence of a region where the cooling capacity is deficient in the high-temperature component.

(3) In some embodiments, in the above configuration (1) or (2), the one or more outlet passages each include a flow passage cross-sectional area reduced portion in which the flow passage cross-sectional area of the outlet passage is gradually decreased toward a downstream side.

With the above configuration (3), adjusting a size in a direction orthogonal to the extending direction of the outlet passage from downstream of the flow passage cross-sectional area reduced portion, the minimum flow passage cross-sectional area of the outlet passage is easily adjusted. Therefore, it is possible to manage the flow rate of the cooling medium as long as the dimension in the direction orthogonal to the extending direction of the outlet passage downstream of the outlet passage is managed, making it possible to narrow the region where accuracy of the flow passage cross-sectional area, that is, dimension accuracy of the passage should be ensured, and to suppress the production cost of the high-temperature component.

(4) In some embodiments, in any one of the above configurations (1) to (3), the one or more outlet passages each have an inner wall surface whose center line average roughness Ra is not greater than 10 μm in a region where the flow passage cross-sectional area of the outlet passage is minimum, and the plurality of cooling passages each have an inner wall surface whose center line average roughness Ra is not less than 10 μm and not greater than 20 μm.

With the above configuration (4), since the respective inner wall surfaces of the plurality of cooling passages have the above-described roughness, it is possible to improve cooling performance in the cooling passages. Moreover, with the above configuration (4), since an inner wall surface of the outlet passage in the region where the flow passage cross-sectional area of the outlet passage is minimum has the above-described roughness, it is possible to suppress the variation in pressure loss in the outlet passage, as well as the foreign substance easily passes through the outlet passage, making it possible to reduce a risk of clogging the outlet passage.

(5) In some embodiments, in any one of the above configurations (1) to (4), walls, respectively, forming the plurality of cooling passages have chamfered corners at downstream ends of the cooling passages.

The walls, respectively, forming the plurality of cooling passages may each have as small wall thickness as possible, as needed in terms of an improvement in heat transfer performance. In this case, if the corner has a shape which is not chamfered at the downstream end of the cooling passage, the shape of the corner may be lost when the high-temperature component is formed by, for example, the precision casting method or the metal additive manufacturing method, and when a subsequent heat treatment is performed. If the shape of the corner is lost, a negative effect is given on the flow of the cooling medium flowing through the cooling passage, which may decrease cooling performance.

By contrast, with the above configuration (5), since the corner is chamfered at the downstream end of the cooling passage, it is possible to suppress the negative effect caused by the loss of the shape of the corner as described above.

(6) In some embodiments, in any one of the above configurations (1) to (5), the number of outlet passages is one.

As described above, in terms of management of the flow rate of the cooling medium, it is desirable to reduce the portion where accuracy of the flow passage cross-sectional area, that is, dimension accuracy of the passage should be ensured. In this regard, with the above configuration (6), since the number of outlet passages is one, it is possible to reduce the portion where dimension accuracy of the passage should be ensured, and to suppress the production cost of the high-temperature component.

(7) In some embodiments, in any one of the above configurations (1) to (6), the high-temperature component is ring segments of a gas turbine which are, respectively, constituted by a plurality of segment bodies annularly formed along a circumferential direction, the plurality of segment bodies each have an inner surface facing a combustion gas flow path through which a combustion gas flows, the plurality of cooling passages are formed in the plurality of segment bodies, respectively, and the one or more outlet passages open into the combustion gas at respective downstream ends of the plurality of segment bodies in an axial direction.

With the above configuration (7), since the ring segments of the gas turbine have any one of the above configurations (1) to (6), the sum of the respective minimum flow passage cross-sectional areas of the one or more outlet passages is less than the sum of the respective flow passage cross-sectional areas of the plurality of cooling passages in the connection between the header and the cooling passages. Thus, it is possible to define the flow rate of the cooling medium in the plurality of cooling passages by the minimum flow passage cross-sectional areas of the cooling passages. Thus, in each of the plurality of cooling passages, the flow passage cross-sectional area need not be decreased more than necessary to control the flow rate of the cooling medium, improving dimension accuracy of the cooling passages and making it possible to suppress a variation in flow rate of the cooling medium among the plurality of cooling passages. Therefore, it is possible to avoid deficiency in cooling capacity while suppressing excess cooling in the ring segments.

Further, with the above configuration (7), since the respective minimum flow passage cross-sectional areas of the one or more outlet passages are not less than the respective flow passage cross-sectional areas of the plurality of cooling passages in the connection between the header and the cooling passages, dimension accuracy of the outlet passage is easily ensured in the ring segments, and blockage in the outlet passage by a foreign substance hardly occurs.

Furthermore, with the above configuration (7), since the one or more outlet passages are less in number than the plurality of cooling passages, in terms of management of the flow rate of the cooling medium, it is possible to reduce the portion where accuracy of the flow passage cross-sectional area, that is, dimension accuracy of the passage should be ensured, and to suppress a production cost of the ring segments.

(8) A production method for a high-temperature component according to at least one embodiment of the present invention is a production method for a high-temperature component which is used for a turbomachinery and needs to be cooled by a cooling medium, the method including a step of forming a plurality of cooling passages through which the cooling medium can flow, a step of forming a header connected to respective downstream ends of the plurality of cooling passages; and a step of forming one or more outlet passages for discharging the cooling medium flowing into the header to outside of the header. The one or more outlet passages are less in number than the plurality of cooling passages. Respective minimum flow passage cross-sectional areas of the one or more outlet passages are not less than respective flow passage cross-sectional areas of the plurality of cooling passages in a connection between the header and the cooling passages. A sum of the respective minimum flow passage cross-sectional areas of the one or more outlet passages is less than a sum of the respective flow passage cross-sectional areas of the plurality of cooling passages in the connection between the header and the cooling passages.

With the above method (8), since the sum of the respective minimum flow passage cross-sectional areas of the one or more outlet passages is less than the sum of the respective flow passage cross-sectional areas of the plurality of cooling passages in the connection between the header and the cooling passages, it is possible to define the flow rate of the cooling medium in the plurality of cooling passages by the minimum flow passage cross-sectional areas of the cooling passages. Thus, in each of the plurality of cooling passages, the flow passage cross-sectional area need not be decreased more than necessary to control the flow rate of the cooling medium, improving dimension accuracy of the cooling passages and making it possible to suppress a variation in flow rate of the cooling medium among the plurality of cooling passages. Therefore, it is possible to avoid deficiency in cooling capacity while suppressing excess cooling.

Further, with the above method (8), since the respective minimum flow passage cross-sectional areas of the one or more outlet passages can be not less than the respective flow passage cross-sectional areas of the plurality of cooling passages in the connection between the header and the cooling passages, dimension accuracy of the outlet passage is easily ensured, and blockage in the outlet passage by a foreign substance hardly occurs.

Furthermore, with the above method (8), since the one or more outlet passages are less in number than the plurality of cooling passages, in terms of management of the flow rate of the cooling medium, it is possible to reduce the portion where accuracy of the flow passage cross-sectional area, that is, dimension accuracy of the passage should be ensured, and to suppress a production cost of the high-temperature component.

(9) In some embodiments, in the above method (8), the step of forming the one or more outlet passages includes forming the one or more outlet passages to each include a flow passage cross-sectional area reduced portion in which the flow passage cross-sectional area of the outlet passage is gradually decreased toward a downstream side.

With the above method (9), since the outlet passage is formed such that the flow passage cross-sectional area reduced portion has the minimum flow passage cross-sectional area in the outlet passage, in terms of management of the flow rate of the cooling medium, it is only necessary to manage dimension accuracy of the most downstream region in the flow passage cross-sectional area reduced portion. Thus, it is possible to narrow the region where accuracy of the flow passage cross-sectional area, that is, dimension accuracy of the passage should be ensured, and to suppress the production cost of the high-temperature component.

(10) In some embodiments, in the above method (8) or (9), the step of forming the one or more outlet passages includes forming the one or more outlet passages by a metal additive manufacturing method or a precision casting method, and the method further comprises a step of performing machining on at least a part of an inner wall surface of each of the one or more outlet passages.

With the above method (10), it is possible to suppress the production cost of the high-temperature component, as compared to a case where the outlet passage is formed by machining alone. Moreover, with the above method (10), it is possible to improve dimension accuracy of the inner wall surface of the outlet passage and to improve control accuracy of the flow rate of the cooling medium, as compared to a case where the outlet passage is formed by the metal additive manufacturing method or the precision casting method alone. Furthermore, with the above method (10), it is possible to adjust the dimension of the inner wall surface of the outlet passage while checking the flow rate of the cooling medium, making it possible to suppress excess or deficiency of the flow rate of the cooling medium.

(11) In some embodiments, in the above method (10), the step of performing machining includes cutting the one or more outlet passages with a drill.

With the above method (11), since it is possible to define the dimension of the inner wall surface of the outlet passage by the diameter of the drill, the high-temperature component is easily produced.

(12) A flow rate control method according to at least one embodiment of the present invention is a flow rate control method for a cooling medium that flows inside a high-temperature component which is used for a turbomachinery and needs to be cooled by the cooling medium, the method including a step of forming a plurality of cooling passages through which the cooling medium can flow, a step of forming a header connected to respective downstream ends of the plurality of cooling passages, a step of forming, by a metal additive manufacturing method or a precision casting method, one or more outlet passages for discharging the cooling medium flowing into the header to outside of the header, and a step of cutting the one or more outlet passages with a drill.

With the above method (12), since it is possible to define the dimension of the inner wall surface of the outlet passage by the diameter of the drill, the flow rate of the cooling medium is easily controlled. Therefore, it is possible to easily avoid deficiency in cooling capacity while suppressing excess cooling.

(13) In some embodiments, in the above method (12), the high-temperature component includes a plurality of cooling passage groups each including the one header, at least two of the cooling passages connected at respective downstream ends to the header, and the one or more outlet passages connected to the header, the step of forming the plurality of cooling passages includes forming the cooling passages included in each of the plurality of cooling passage groups, the step of forming the header includes forming the header included in each of the plurality of cooling passage groups, the step of forming the one or more outlet passages includes forming the outlet passages included in each of the plurality of cooling passage groups, and, the step of cutting the one or more outlet passages with the drill includes cutting, with the drill, the outlet passages included in each of the plurality of cooling passage groups.

With the above method (13), since it is possible to define the dimension of the inner wall surface of each outlet passage by the diameter of the drill, the variation in flow rate of the cooling medium among the plurality of cooling passage groups is easily suppressed.

Advantageous Effects

According to at least one embodiment of the present invention, it is possible to provide a high-temperature component capable of avoiding deficiency in cooling capacity while suppressing excess cooling.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

A high-temperature component according to some embodiments will be described below by taking a high-temperature component used for a gas turbine as an example.

Figure 1:
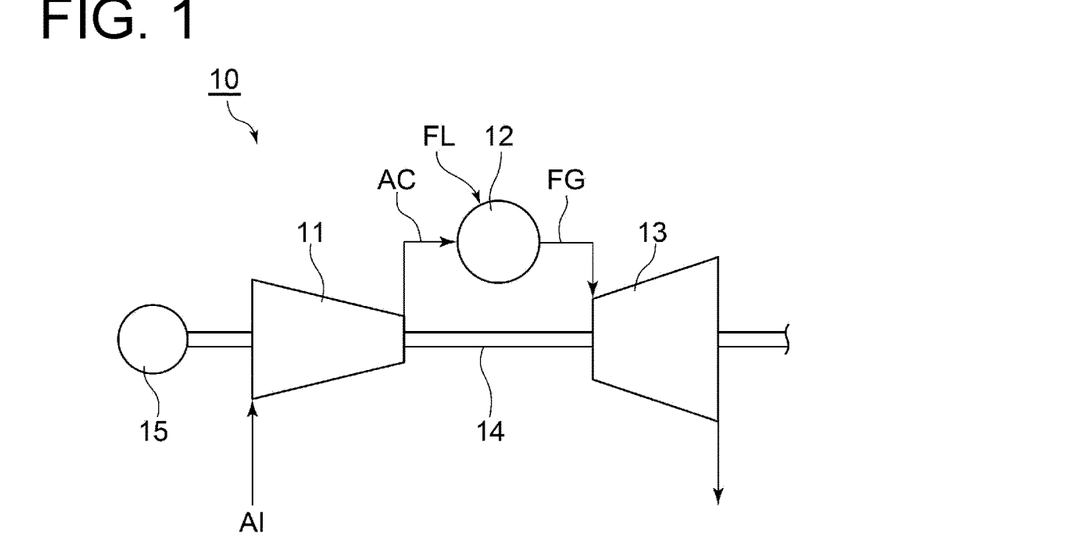
FIG. 1 is a schematic view showing the overall configuration of a gas turbine.
Figure 2:
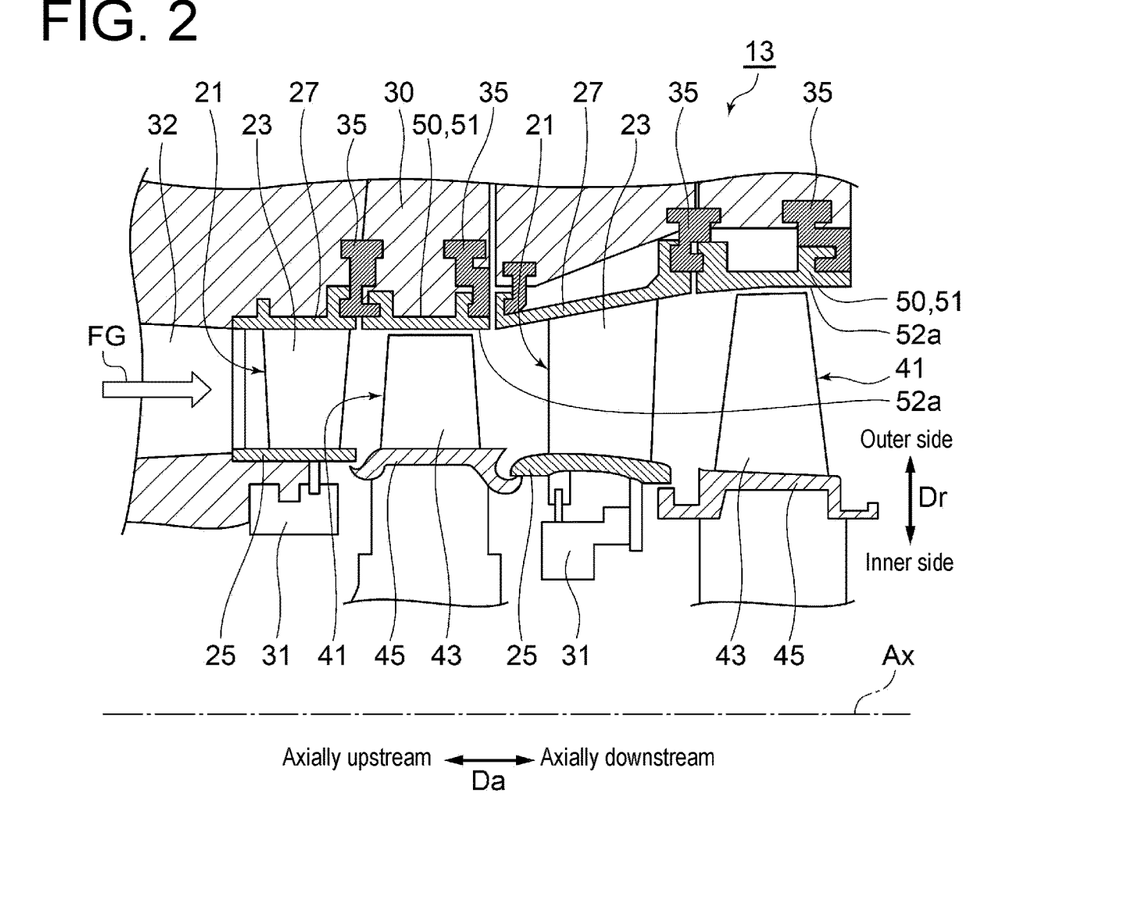
FIG. 2 is a cross-sectional view showing a gas flow path of a turbine.

FIG. 1 is a schematic view showing the overall configuration of the gas turbine. FIG. 2 is a cross-sectional view showing a gas flow path of a turbine.

In the present embodiment, as shown in FIG. 1, a gas turbine 10 is configured such that a compressor 11, a combustor 12 and a turbine 13 are coaxially disposed by a rotor 14, and the rotor 14 is coupled at one end to a generator 15. In the description below, a direction in which the axis of the rotor 14 extends will be referred to as an axial direction Da, a circumferential direction centered on the axis of the rotor 14 will be referred to as a circumferential direction Dc, and a direction perpendicular to an axis Ax of the rotor 14 will be referred to as a radial direction Dr. In addition, of the circumferential direction Dc, a rotational direction of the rotor 14 will be referred to as a rotational direction R.

The compressor 11 generates high-temperature/high-pressure compressed air AC by causing air AI taken from an air inlet to pass through a plurality of stator vanes and rotor blades to be compressed. The combustor 12 generates a high-temperature/high-pressure combustion gas FG by supplying predetermined fuel FL to the compressed air AC to be combusted. The turbine 13 drivingly rotates the rotor 14 by causing the high-temperature/high-pressure combustion gas FG generated by the combustor 12 to pass through the plurality of stator vanes and rotor vanes, and drives the generator 15 coupled to the rotor 14.

Moreover, as shown in FIG. 2, in the turbine 13, turbine stator vanes (stator vanes) 21 are configured such that airfoils 23 are fixed at hub sides to inner shrouds 25 and fixed at tip sides to outer shrouds 27, respectively. Turbine rotor blades (rotor blades) 41 are configured such that bases of airfoils 43 are fixed to platforms 45, respectively. Then, the outer shrouds 27 and ring segments 50 disposed on tip sides of the rotor blades 41 are supported by a casing (turbine casing) 30 via heat-insulating rings 35, and the inner shrouds 25 are supported by support rings 31, respectively. Thus, a combustion gas flow path 32 through which the combustion gas FG passes is formed along the axial direction Da as a space surrounded by the inner shrouds 25, the outer shrouds 27, the platforms 45, and the ring segments 50.

The inner shrouds 25, the outer shrouds 27, and the ring segments 50 function as gas path surface forming members, respectively. The gas path surface forming members partition the combustion gas flow path 32 and have a gas path surface where the combustion gas FG contacts.

The combustor 12, the rotor blades 41 (for example, the platforms 45), the stator vanes 21 (for example, the inner shrouds 25 and the outer shrouds 27), the ring segments 50, and the like are high-temperature components used under a high-temperature environment where the combustion gas FG contacts, and need to be cooled by a cooling medium. In the following description, as an example of a cooling structure of the high-temperature component, a cooling structure of the ring segment 50 will be described.

Figure 3:
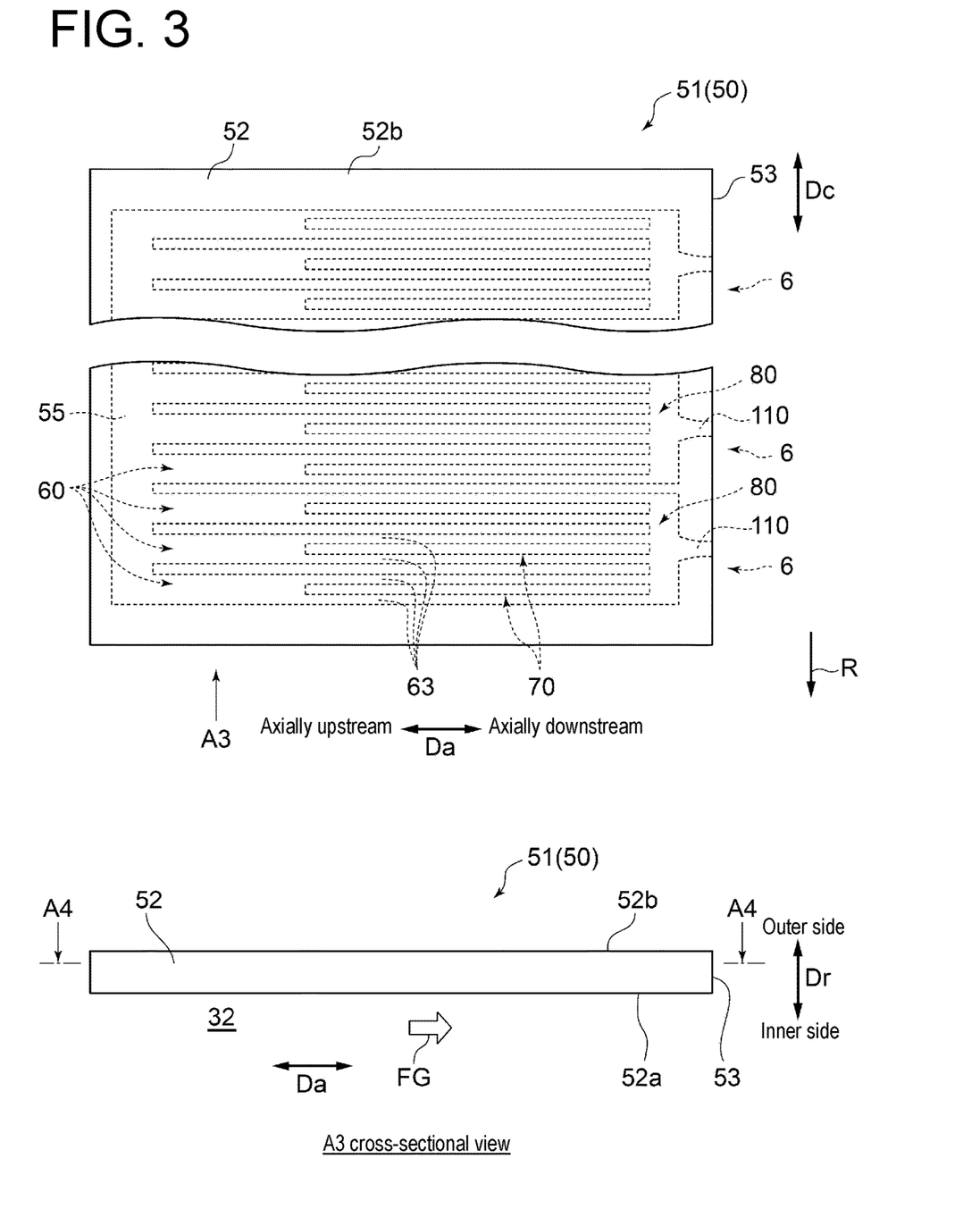
FIG. 3 shows a schematic plan view of a segment body as viewed from an outer side in the radial direction, and a schematic side view of the segment body as viewed from a downstream side in a rotational direction of the rotor toward an upstream side in the rotational direction along the circumferential direction according to some embodiments.
Figure 4:
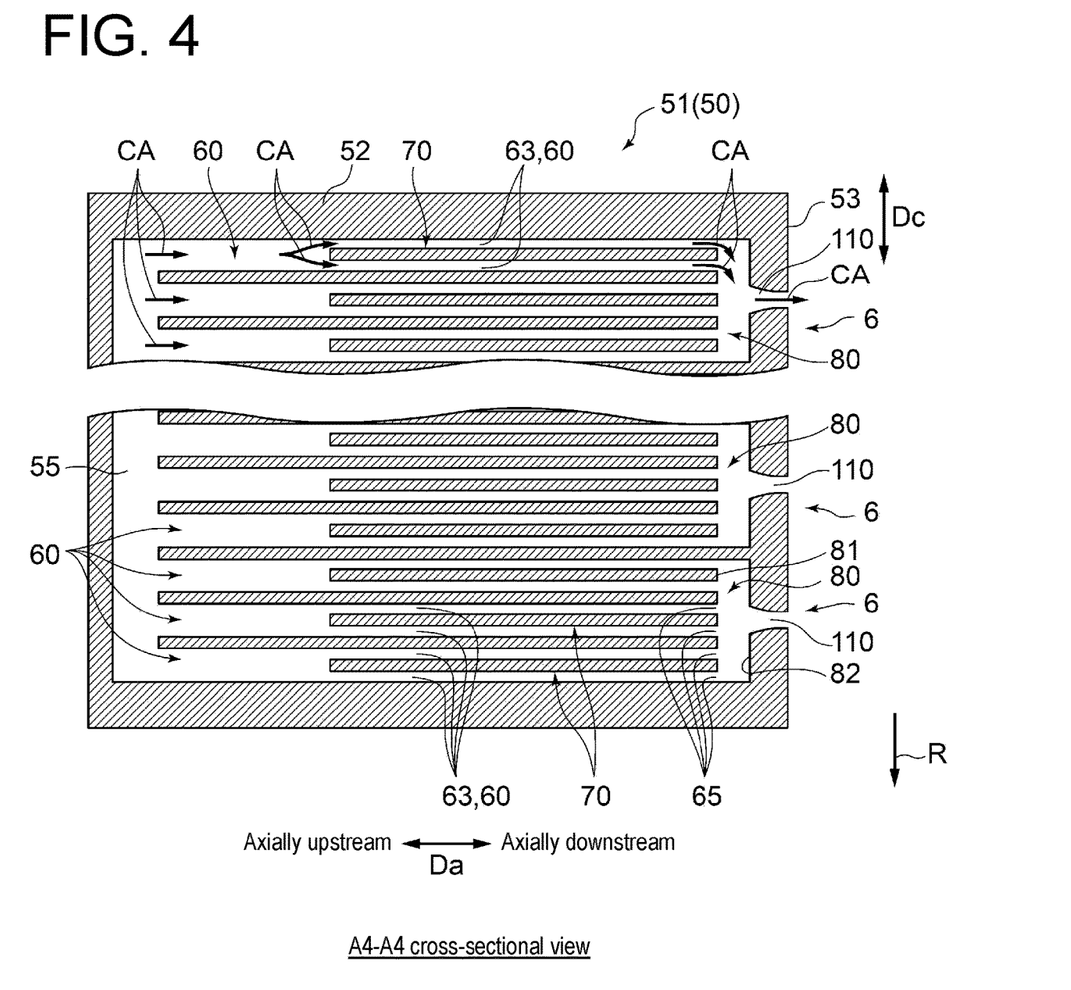
FIG. 4 is a cross-sectional view taken along line A4-A4 in FIG. 3.

FIG. 3 shows a schematic plan view of one of segment bodies 51 constituting a corresponding one of the ring segments 50 as viewed from an outer side in the radial direction Dr, and a schematic side view of the segment body 51 as viewed from a downstream side in the rotational direction R of the rotor 14 toward an upstream side in the rotational direction R along the circumferential direction Dc according to some embodiments. FIG. 4 is a cross-sectional view taken along line A4-A4 in FIG. 3. FIG. 3 simplistically depicts the structure of the segment body 51. Therefore, for example, FIG. 3 omits the description of a hook or the like for mounting the segment body 51 on the heat insulating ring 35.

The ring segments 50 according to some embodiments are, respectively, constituted by the plurality of segment bodies 51 annularly formed in the circumferential direction Dc. Each segment body 51 includes, as a major component, a body 52 internally forming cooling flow paths. As shown in FIG. 2, the segment body 51 is disposed such that an inner surface 52a in the radial direction Dr faces the combustion gas flow path 32 where the combustion gas FG flows. On the inner side of the segment bodies 51 in the radial direction Dr, the rotor blades 41 rotating about the rotor 14 are disposed at regular intervals. In order to prevent thermal damage by the high-temperature combustion gas FG, a plurality of axial passages (cooling passages) 60 extending in the axial direction Da are formed in the segment body 51.

The plurality of cooling passages 60 are disposed in parallel in the circumferential direction Dc.

In some embodiments, the circumferential direction Dc in the cooling passages 60 will be referred to as a width direction of the cooling passages 60. Moreover, in some embodiments, the radial direction Dr orthogonal to the width direction in the cooling passages 60 will be referred to as a height direction of the cooling passages 60.

Although not illustrated, the gas turbine 10 according to an embodiment is configured such that cooling air CA is supplied to each segment body 51 according to some embodiments from the side of an outer surface 52b. The cooling air CA supplied to the segment body 51 convection-cools the body 52 of the segment body 51 in the process of flowing through the cooling passages 60 and being discharged into the combustion gas FG.

Hereinafter, the cooling structure of the segment body 51 according to some embodiments will be described.

Each of the cooling passages 60 according to some embodiments is connected at an upstream end to a cooling air manifold 55. Each of the cooling passages 60 according to some embodiments internally forms a partition wall 70 for dividing the cooling passage 60 into a plurality of branch flow passages 63 from the middle. In some embodiments, the partition wall 70 divides the cooling passage 60 into a pair of branch flow passages 63 from the middle in the width direction of the cooling passage 60.

In the cooling passage 60 according to some embodiments, that is, a section upstream of the partition wall 70 and the branch flow passages 63, a flow passage cross-sectional shape of the cooling passage 60 as viewed from the extending direction of the cooling passage 60 may be a rectangular shape, may be a circular shape, may be a polygonal shape other than the rectangular shape, or may be an oval shape. Moreover, the types of flow passage cross-sectional shapes may be different between the branch flow passage 63 and the section upstream of the partition wall 70 in the cooling passage 60. That is, the flow passage cross-sectional shape in the section upstream of the partition wall 70 may be the rectangular shape, and the flow passage cross-sectional shape in each branch flow passage 63 may be the circular shape. Moreover, the flow passage cross-sectional shape in each branch flow passage 63 may be a shape obtained by dividing a circle or an oval into halves by a corresponding one of the partition walls 70.

The cooling passage 60 cools the segment body 51 by cooling an inner wall surface of the cooling passage 60. Thus, the cooling passage 60 has a length which is at least five times greater than the equivalent diameter of the cooling passage 60. The equivalent diameter of the cooling passage 60 is a diameter of a flow path when the cooling passage 60 is replaced with a circular flow path which is equivalent in terms of flux of the cooling air CA, if the cross-sectional shape of the cooling passage 60 is a shape other than the circular shape.

Each of the plurality of branch flow passages 63 is connected at a downstream end 65 to a header 80. In some embodiments, for example, the respective downstream ends 65 of the six branch flow passages 63 in the three cooling passages 60 adjacent to each other are connected to an upstream inner wall 81 of the one header 80. In some embodiments, the plurality of headers 80 are formed in the segment body 51.

Each header 80 is a cuboid space that are surrounded by the upstream inner wall 81 and a downstream inner wall 82 which are a pair of walls facing in the axial direction Da, lateral inner walls 83, 84 which are a pair of walls facing in the circumferential direction Dc, and inner walls (not shown) which are a pair of walls facing in the radial direction Dr.

In the downstream inner wall 82 of each header 80, at least one outlet passage 110 for discharging the cooling air CA flowing into the header 80 to the outside of the header 80, that is, the outside of the segment body 51 is formed. In the embodiment shown in FIG. 3, in each header 80, the one outlet passage 110 is formed in the vicinity of the center of the downstream inner wall 82 in the circumferential direction Dc. The outlet passage 110 opens into the combustion gas FG at a downstream end 53 of the segment body 51 in the axial direction Da.

In some embodiments, the segment body 51 includes a plurality of cooling passage groups 6 each including the one header 80, the three cooling passages 60 connected at the respective downstream ends to the header 80, and the one outlet passage 110 connected to the header 80.

The cooling air CA supplied from the outside of the segment body 51 to the segment body 51 is supplied to the cooling air manifold 55, and then distributed to each cooling passage 60 from the cooling air manifold 55. The cooling air CA distributed to each cooling passage 60 is divided by the partition wall 70 and flows into the respective branch flow passages 63. The cooling air CA flowing into the respective branch flow passages 63 is collected in each header 80 and discharged from the outlet passage 110 to the outside of the segment body 51.

In a machine such as the gas turbine 10 operated by a high-temperature working gas, a loss of heat by cooling generally leads to a decrease in thermal efficiency of the machine. Thus, it is desirable that a high-temperature component is efficiently cooled with as few cooling media as possible. Therefore, it is preferable that a flow passage cross-sectional area in the cooling passage 60 is not large more than necessary.

However, if the flow passage cross-sectional area is small, dimension accuracy of the cooling passage 60 tends to decrease due to a production constraint of the segment body 51 serving as the high-temperature component, which may decrease accuracy of the flow rate of the cooling air CA in the cooling passage 60.

If accuracy of the flow rate of the cooling air CA in the cooling passage 60 is decreased, and the flow rate of the cooling air CA is higher than a design flow rate, heat is taken away by the cooling air CA more than necessary, which may decrease thermal efficiency of the gas turbine 10. Moreover, if the flow rate of the cooling air CA is lower than the design flow rate, the segment body 51 may be damaged by deficient cooling.

In view of the above, an object of at least one embodiment of the present invention is to provide the high-temperature component capable of avoiding deficiency in cooling capacity while suppressing excess cooling.

Thus, in some embodiments, by configuring the cooling structure in the segment body 51 to be described below, deficiency in cooling capacity is avoided while suppressing excess cooling.

Figure 5:
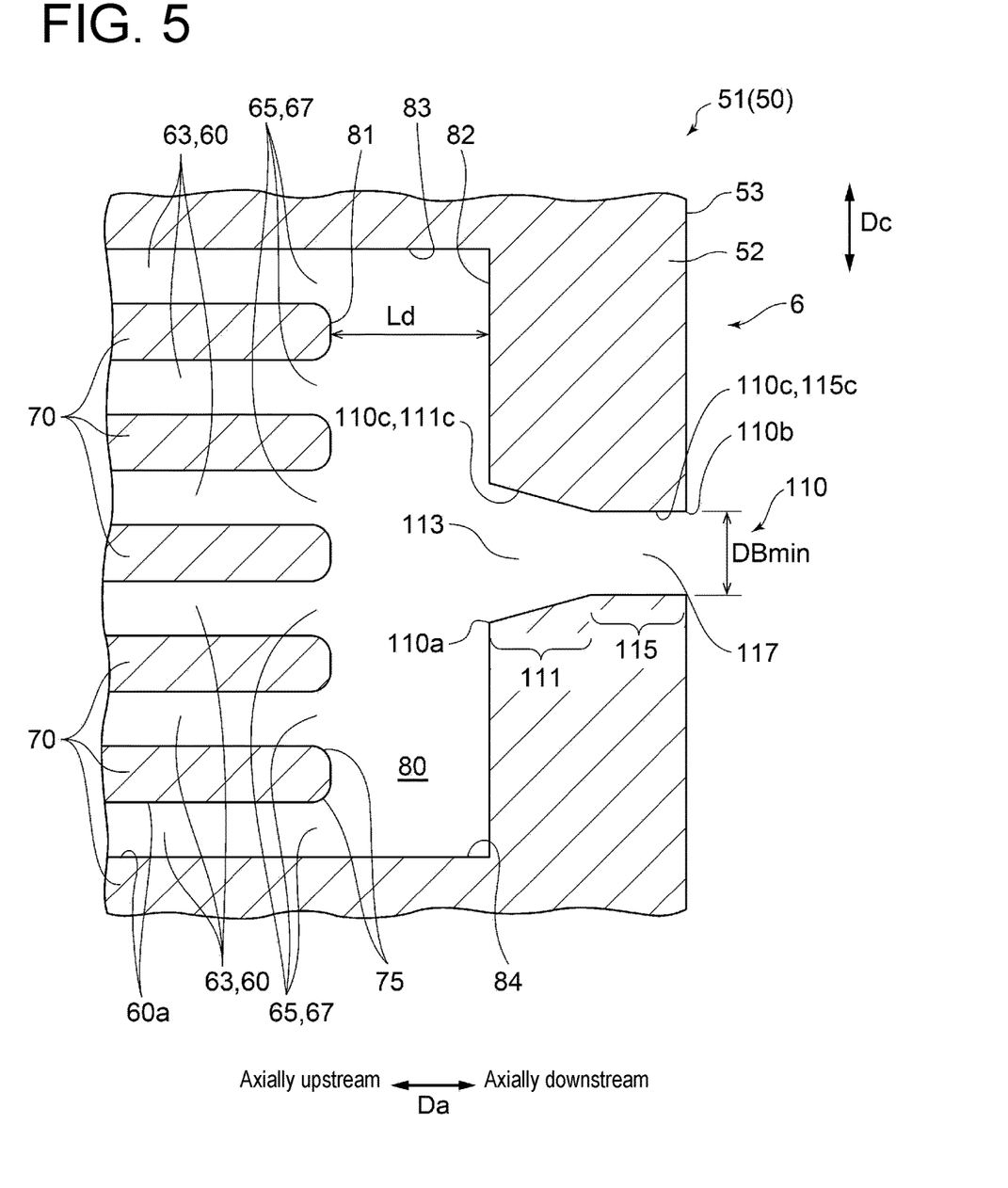
FIG. 5 is an enlarged view of the vicinity of a header in FIG. 4.

FIG. 5 is an enlarged view of the vicinity of the header 80 in FIG. 4.

In some embodiments, as shown in FIGS. 3 to 5, in the segment body 51, the number of outlet passages 110 connected to the one header 80 is less than the number of plurality of cooling passages 60 connected to the one header 80. For example, in some embodiments, as shown in FIGS. 3 to 5, the six cooling passages 60 (six branch flow passages 63), respectively, divided by the partition walls 70 and the one outlet passage 110 are connected to the one header 80.

In some embodiments, as well shown in FIG. 5, the outlet passage 110 includes an upstream region 111 and a downstream region 115. In the upstream region 111, a flow passage cross-sectional area reduced portion 113 is formed in which the flow passage cross-sectional area is gradually decreased toward a downstream side. In the downstream region 115, a minimum flow passage cross-sectional area portion 117 is formed in which the flow passage cross-sectional area is minimum.

In some embodiments, the flow passage cross-sectional shape of the outlet passage 110 as viewed from the extending direction of the outlet passage 110 is a circular shape in the upstream region 111 and the downstream region 115. However, the flow passage cross-sectional shape of the outlet passage 110 may be a rectangular shape, may be a polygonal shape other than the rectangular shape, or may be an oval shape in the upstream region 111 and the downstream region 115. Moreover, the types of flow passage cross-sectional shapes may be different between the upstream region 111 and the downstream region 115. That is, the flow passage cross-sectional shape in the upstream region 111 may be the rectangular shape, and the flow passage cross-sectional shape in the downstream region 115 may be the circular shape.

Considering the case as well in which the flow passage cross-sectional shape in the downstream region 115 is the shape other than the circular shape, the following description will be given by the equivalent diameter of the minimum flow passage cross-sectional area portion 117 when the size of the flow path is mentioned in the downstream region 115 (minimum flow passage cross-sectional area portion 117).

The equivalent diameter of the minimum flow passage cross-sectional area portion 117 is a diameter of the minimum flow passage cross-sectional area portion 117 when the flow path is replaced with a circular flow path which is equivalent in terms of flux of the cooling air CA, if the cross-sectional shape of the minimum flow passage cross-sectional area portion 117 is a shape other than the circular shape. If the cross-sectional shape of the minimum flow passage cross-sectional area portion 117 is the circular shape, the equivalent diameter of the minimum flow passage cross-sectional area portion 117 is the diameter of the minimum flow passage cross-sectional area portion 117.

In some embodiments, in the segment body 51, respective minimum flow passage cross-sectional areas SBmin of the outlet passages 110 are not less than respective flow passage cross-sectional areas SA of the plurality of cooling passages 60 (branch flow passages 63) in a connection 67 between the header 80 and the cooling passages 60.

In some embodiments, as shown in FIGS. 3 to 5, in the segment body 51, the respective minimum flow passage cross-sectional areas SBmin are less than a sum ΣSA of the respective flow passage cross-sectional areas SA of the plurality of cooling passages 60 (branch flow passages 63) connected to the one header 80 in the connection 67.

If not less than two outlet passages 110 are connected to the one header 80, the respective minimum flow passage cross-sectional areas SBmin of the outlet passages 110 connected to the one header 80 are not less than the respective flow passage cross-sectional areas SA of the plurality of cooling passages 60 in the connection 67.

Moreover, if not less than two outlet passages 110 are connected to the one header 80, a sum ΣSBmin of the respective minimum flow passage cross-sectional areas SBmin of the outlet passages 110 connected to the one header 80 is less than the sum ΣSA of the respective flow passage cross-sectional areas SA of the plurality of cooling passages 60 connected to the one header 80 in the connection 67.

As will be described later, the segment body 51 can be formed by, for example, a metal additive manufacturing method or a precision casting method. Thus, if the flow passage cross-sectional area SA of the cooling passage 60 is small, dimension accuracy of the cooling passage 60 tends to decrease due to a production constraint of the segment body 51.

In a case where the flow rate of the cooling air CA flowing through each of the plurality of cooling passages 60 is decided by each of the flow passage cross-sectional areas SA of the plurality of cooling passages 60, if the flow passage cross-sectional area SA is small, dimension accuracy of the cooling passages 60 is decreased as described above, which may decrease accuracy of the flow rate of the cooling air CA in the cooling passages 60.

By contrast, with the segment body 51 according to some embodiments, since the sum ΣSBmin of the respective minimum flow passage cross-sectional areas SBmin of the one or more outlet passages 110 is less than the sum ΣSA of the respective flow passage cross-sectional areas SA of the plurality of cooling passages 60 in the connection 67, it is possible to define the flow rate of the cooling air CA in the plurality of cooling passages 60 by the minimum flow passage cross-sectional areas SBmin of the outlet passages 110. Thus, in each of the plurality of cooling passages 60, the flow passage cross-sectional area SA need not be decreased more than necessary to control the flow rate of the cooling air CA, improving dimension accuracy of the cooling passages 60 and making it possible to suppress a variation in flow rate of the cooling air CA among the plurality of cooling passages 60. Therefore, it is possible to avoid deficiency in cooling capacity while suppressing excess cooling.

Further, with the segment body 51 according to some embodiments, since the respective minimum flow passage cross-sectional areas SBmin of the one or more outlet passages 110 are not less than the respective flow passage cross-sectional areas SA of the plurality of cooling passages 60 in the connection 67, dimension accuracy of the outlet passage 110 in the radial direction is easily ensured, and blockage in the outlet passage 110 by a foreign substance hardly occurs.

Furthermore, with the segment body 51 according to some embodiments, since the one or more outlet passages 110 are less in number than the plurality of cooling passages 60, in terms of management of the flow rate of the cooling air CA, it is possible to reduce a portion where accuracy of the flow passage cross-sectional area, that is, dimension accuracy of the passage should be ensured, and to suppress a production cost of the segment body 51.

In some embodiments, as shown in FIG. 5, in the segment body 51, a separation distance Ld between the upstream inner wall 81 and the downstream inner wall 82 of the header 80, that is, a length between the upstream end and the downstream end of the header 80 is at least one time and at most three times greater than an equivalent diameter DBmin of the downstream region 115 which is a region where the flow passage cross-sectional area of the outlet passage 110 is minimum.

If the upstream inner wall 81, that is, connection positions between the header 80 and the respective downstream ends 65 of the plurality of cooling passages 60, and the downstream inner wall 82, that is, a connection position between the header 80 and an upstream end 110a of the outlet passage 110 are too close to each other, a difference in flow rate of the cooling air CA increases between the cooling passage 60 whose distance between the downstream end 65 of the cooling passage 60 and the upstream end 110a of the outlet passage 110 is small, and the cooling passage 60 whose distance between the downstream end 65 and the upstream end 110a is large.

By contrast, with the segment body 51 according to some embodiments, since the upstream inner wall 81 and the downstream inner wall 82 are separated from each other by at least one time greater than the above-described equivalent diameter DBmin, it is possible to suppress the variation in flow rate of the cooling air CA among the plurality of cooling passages 60.

Moreover, since the respective downstream ends 65 of the plurality of cooling passages 60 are connected to the header 80, a space volume in the header 80 increases, and the flow velocity of the cooling air CA in the header 80 decreases, decreasing a heat transfer coefficient to the cooling air CA. Consequently, the cooling capacity may be decreased in the header 80, and thus it is preferable that the separation distance Ld between the upstream inner wall 81 and the downstream inner wall 82 is not large.

In this regard, with the segment body 51 according to some embodiments, since the separation distance Ld between the upstream inner wall 81 and the downstream inner wall 82 is at most three times greater than the above-described equivalent diameter DBmin, it is possible to suppress occurrence of a region where the cooling capacity is deficient in the segment body 51.

Moreover, if the separation distance Ld between the upstream inner wall 81 and the downstream inner wall 82 is at most three times greater than the above-described equivalent diameter DBmin, it is possible to suppress a decrease in strength of the segment body 51 by suppressing the volume of the header 80, that is, the volume of an interior space of the segment body 51.

In the segment body 51 according to some embodiments, the outlet passage 110 includes the flow passage cross-sectional area reduced portion 113 in which the flow passage cross-sectional area of the outlet passage 110 is gradually decreased toward the downstream side.

Thus, adjusting a size in a direction orthogonal to the extending direction of the outlet passage 110 from downstream of the flow passage cross-sectional area reduced portion 113, the minimum flow passage cross-sectional area SBmin of the outlet passage 110 is easily adjusted. Therefore, it is possible to manage the flow rate of the cooling air CA as long as the dimension in the direction orthogonal to the extending direction of the outlet passage 110 downstream of the outlet passage 110 is managed, making it possible to narrow a region where accuracy of the flow passage cross-sectional area, that is, dimension accuracy of the passage should be ensured, and to suppress the production cost of the segment body 51.

Since the flow passage cross-sectional area reduced portion 113 is formed in the upstream region 111, as will be described later, the inner diameter of a partial section tracing back to upstream from the downstream end 110b becomes constant by performing machining on the outlet passage 110 with a triangular drill from the downstream end 110b toward the upstream end 110a of the outlet passage 110, and the section becomes the downstream region 115. Therefore, it is possible to easily form the minimum flow passage cross-sectional area portion 117 in the downstream region 115.

In the segment body 51 according to some embodiments, the roughness of an inner wall surface 110c of the outlet passage 110 is not greater than the roughness of respective inner wall surfaces 60a of the plurality of cooling passages 60 in a region where the flow passage cross-sectional area of the outlet passage 110 is minimum. That is, in the segment body 51 according to some embodiments, the roughness of an inner wall surface 115a in the downstream region 115 is not greater than the roughness of the respective inner wall surfaces 60a of the plurality of cooling passages 60.

Since the inner wall surface 110c of the outlet passage 110 has the above-described roughness, a variation in pressure loss in the outlet passage 110 is small, making it possible to improve control accuracy of the flow rate of the cooling air CA. Moreover, since the inner wall surface 110c of the outlet passage 110 has the above-described roughness, a foreign substance easily passes through the outlet passage 110, making it possible to reduce a risk of clogging the outlet passage 110.

In the segment body 51 according to some embodiments, the roughness of an inner wall surface 111a in the upstream region 111 may not be less than, or equal to, the roughness of the respective inner wall surfaces 60a of the plurality of cooling passages 60.

For example, in some embodiments, the inner wall surface 110c of the outlet passage 110 has a center line average roughness Ra which is not greater than 10 μm in the downstream region 115. Moreover, in some embodiments, the inner wall surfaces 60a of the plurality of cooling passages 60 each have the center line average roughness Ra which is not less than 10 μm and not greater than 20 μm.

With the segment body 51 according to some embodiments, since the inner wall surfaces 60c of the plurality of cooling passages 60 each have the above-described roughness, it is possible to improve cooling performance in the cooling passages 60. Moreover, with the segment body 51 according to some embodiments, since an inner wall surface 115c of the downstream region 115 in the outlet passage 110 has the above-described roughness, it is possible to suppress the variation in pressure loss in the outlet passage 110, as well as the foreign substance easily passes through the outlet passage 110, making it possible to reduce the risk of clogging the outlet passage 110.

In the segment body 51 according to some embodiments, the walls, respectively, forming the plurality of cooling passages 60, that is the partition walls 70 have chamfered corners 75 at the downstream ends 65 of the cooling passages 60.

The partition walls 70 which also serve as the walls, respectively, forming the plurality of cooling passages 60 (branch flow passages 63) may each have as small wall thickness, that is, dimension of the partition wall 70 in the circumferential direction Dc as possible, as needed in terms of an improvement in heat transfer performance. In this case, if the corner 75 has a shape which is not chamfered at the downstream end 65 of the cooling passage 60 (branch flow passage 63), the shape of the corner may be lost when the segment body 51 is formed by, for example, the precision casting method or the metal additive manufacturing method, and when a subsequent heat treatment is performed. If the shape of the corner is lost, a negative effect is given on the flow of the cooling air CA flowing through the cooling passage 60, which may decrease cooling performance.

By contrast, with the segment body 51 according to some embodiments, since the corner 75 is chamfered at the downstream end 65 of the cooling passage 60, it is possible to suppress the negative effect caused by the loss of the shape of the corner 75 as described above.

For example, in some embodiments, as shown in FIGS. 3 to 5, the one outlet passage 110 is connected to the one header 80.

As described above, in terms of management of the flow rate of the cooling air CA, it is desirable to reduce the portion where accuracy of the flow passage cross-sectional area, that is, dimension accuracy of the passage should be ensured. In this regard, according to some embodiments shown in FIGS. 3 to 5, since the one outlet passage 110 is connected to the one header 80, it is possible to reduce the portion where dimension accuracy of the passage should be ensured and to suppress the production cost of the segment body 51.

(Production Method for Segment Body 51)

Figure 6:
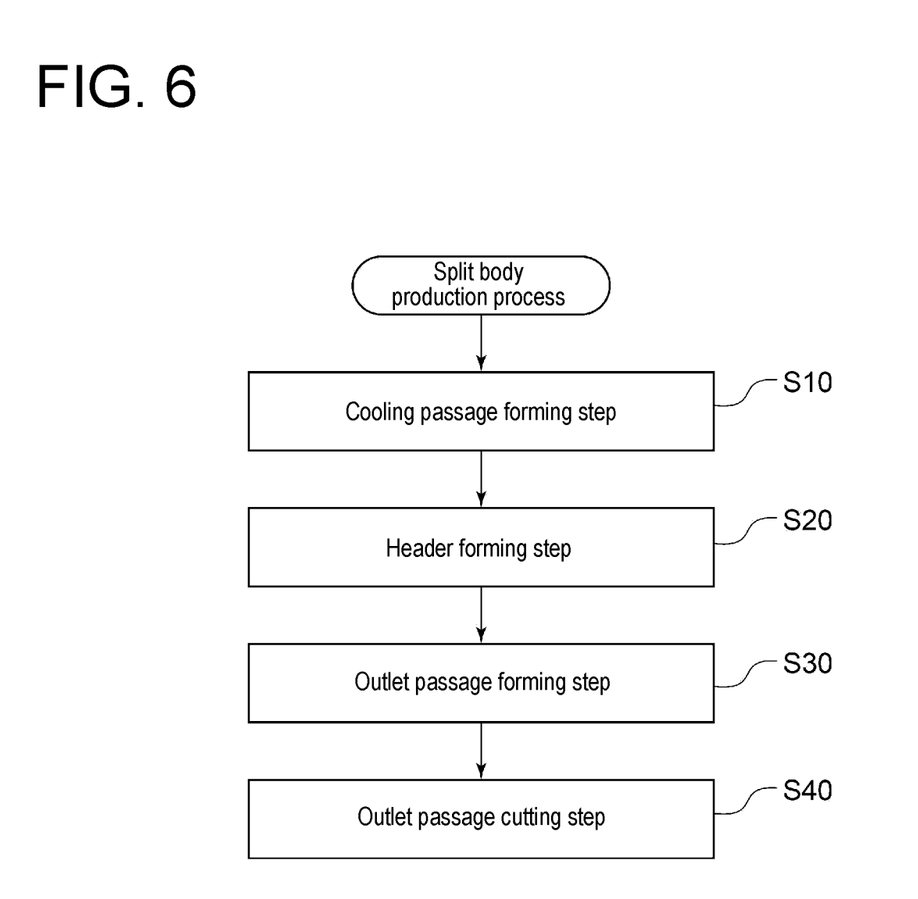
FIG. 6 is a flowchart showing an example of a creation procedure in a case where the segment body is created by a metal additive manufacturing method according to some embodiments.

Hereinafter, a production method for the above-described segment body 51 according to some embodiments will be described. The segment body 51 according to some embodiments can be produced by, for example, the metal additive manufacturing method or the precision casting method. FIG. 6 is a flowchart showing an example of a creation procedure in a case where the segment body 51 is created by the metal additive manufacturing method according to some embodiments. The production method for the segment body 51 according to some embodiments includes a cooling passage forming step S10, a header forming step S20, an outlet passage forming step S30, and an outlet passage cutting step S40.

A forming method for the segment body 51 according to some embodiments may be, for example, powder bed fusion, may be metal deposition, may be binder jetting, or may be another method other than the above-described methods. In the following description, a case will be described in which the forming method for the segment body 51 according to some embodiments is, for example, powder bed fusion or metal deposition.

The cooling passage forming step S10 is a step of forming the plurality of cooling passages 60 through which the cooling air CA can flow. The cooling passage forming step S10 includes, for example, forming the segment body 51 up to the respective downstream ends 65 of the cooling passages 60 by laminating base powder from upstream in the axial direction Da toward downstream in the axial direction Da.

The header forming step S20 is a step of forming the header connected to the respective downstream ends of the plurality of cooling passages. Followed by the cooling passage forming step S10, the header forming step S20 includes forming the segment body 51 up to the downstream inner wall 82 of the header 80 by laminating the base powder from upstream in the axial direction Da toward downstream in the axial direction Da.

The outlet passage forming step S30 is a step of forming the one or more outlet passages 110 for discharging the cooling air CA flowing into the header 80 to the outside of the header 80. Followed by the header forming step S20, the outlet passage forming step S30 includes forming the segment body 51 up to the downstream end 110b of the outlet passage 110 by laminating the base powder from upstream in the axial direction Da toward downstream in the axial direction Da.

The outlet passage forming step S30 includes forming the outlet passage 110 to include the flow passage cross-sectional area reduced portion 113 in which the flow passage cross-sectional area of the outlet passage 110 is gradually decreased toward the downstream side.

Figure 7:
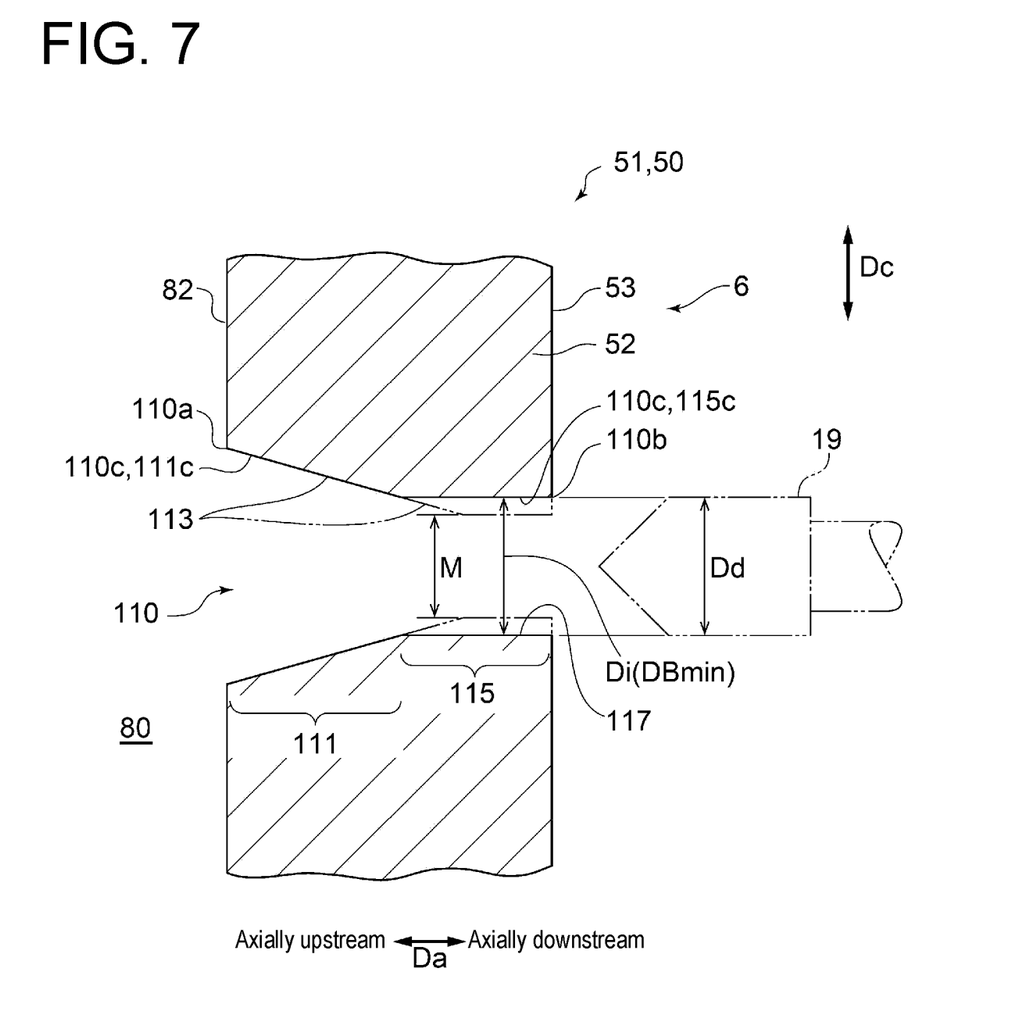
FIG. 7 is a view for describing an outlet passage cutting step.

FIG. 7 is a view for describing the outlet passage cutting step S40 to be described later. FIG. 7 depicts, by double-dotted chain lines, a downstream shape of the outlet passage 110 before being cut with a triangular drill 19 in the outlet passage cutting step S40, and the triangular drill 19.

The outlet passage forming step S30 according to some embodiments includes forming the downstream side of the outlet passage 110 such that a dimension in the direction orthogonal to the extending direction of the outlet passage 110 on the downstream side of the outlet passage 110 is smaller than a diameter Dd of the triangular drill 19. That is, the outlet passage forming step S30 according to some embodiments includes forming the flow passage cross-sectional area reduced portion 113 such that a dimension M in the direction orthogonal to the extending direction of the outlet passage 110 on the most downstream side of the flow passage cross-sectional area reduced portion 113 is smaller than the diameter Dd of the triangular drill 19.

The outlet passage cutting step S40 is a step of performing machining on at least a part of the inner wall surface 110c of the outlet passage 110. More specifically, the outlet passage cutting step S40 is a step of cutting the outlet passage 110 with the triangular drill 19. The outlet passage cutting step S40 includes performing machining on the outlet passage 110 from the downstream end 110b toward the upstream end 110a of the outlet passage 110 with the triangular drill 19. Consequently, the inner diameter of the partial section tracing back to upstream from the downstream end 110b becomes constant, and the section becomes the downstream region 115.

The cooling passage forming step S10 and the header forming step S20 need not necessarily be performed by the metal additive manufacturing method, but may be performed by the precision casting method. Then, the outlet passage forming step S30 may be performed by the metal additive manufacturing method. In addition, the process from the cooling passage forming step S10 to the outlet passage forming step S30 may be performed by the precision casting method.

In the production method for the segment body 51 according to some embodiments, the segment body 51 is formed such that the number of outlet passages 110 connected to the one header 80 is less than the number of plurality of cooling passages 60 connected to the one header 80.

Moreover, in the production method for the segment body 51 according to some embodiments, the segment body 51 is formed such that the respective minimum flow passage cross-sectional areas SBmin of the outlet passage 110 are not less than the respective flow passage cross-sectional areas SA of the plurality of cooling passages 60 (branch flow passages 63) in the connection 67 between the header 80 and the cooling passages 60.

Furthermore, in the production method for the segment body 51 according to some embodiments, the segment body 51 is formed such that the respective minimum flow passage cross-sectional areas SBmin of the outlet passages 110 are less than the sum ΣSA of the respective flow passage cross-sectional areas SA of the plurality of cooling passages 60 (branch flow passages 63) connected to the one header 80 in the connection 67.

If the segment body 51 is formed such that not less than two outlet passages 110 are connected to the one header 80, the segment body 51 is formed such that the respective minimum flow passage cross-sectional areas SBmin of the outlet passages 110 connected to the one header 80 are not less than the respective flow passage cross-sectional areas SA of the plurality of cooling passages 60 in the connection 67.

Moreover, if the segment body 51 is formed such that not less than two outlet passages 110 are connected to the one header 80, the segment body 51 is formed such that the sum ΣSBmin of the respective minimum flow passage cross-sectional areas SBmin of the outlet passages 110 connected to the one header 80 is less than the sum ΣSA of the respective flow passage cross-sectional areas SA of the plurality of cooling passages 60 connected to the one header 80 in the connection 67.

With the production method for the segment body 51 according to some embodiments, since the sum ΣSBmin of the respective minimum flow passage cross-sectional areas SBmin of the one or more outlet passages 110 is less than the sum ΣSA of the respective flow passage cross-sectional areas SA of the plurality of cooling passages 60 in the connection 67, it is possible to define the flow rate of the cooling air CA in the plurality of cooling passages 60 by the minimum flow passage cross-sectional areas SBmin of the outlet passages 110. Thus, in each of the plurality of cooling passages 60, the flow passage cross-sectional area need not be decreased more than necessary to control the flow rate of the cooling air CA, improving dimension accuracy of the cooling passages 60 and making it possible to suppress the variation in flow rate of the cooling air CA among the plurality of cooling passages 60. Therefore, it is possible to avoid deficiency in cooling capacity while suppressing excess cooling.

Further, with the production method for the segment body 51 according to some embodiments, since the respective minimum flow passage cross-sectional areas SBmin of the one or more outlet passages 110 can be not less than the respective flow passage cross-sectional areas SA of the plurality of cooling passages 60 in the connection 67, dimension accuracy of the outlet passage 110 is easily ensured, and blockage in the outlet passage 110 by the foreign substance hardly occurs.

Furthermore, with the production method for the segment body 51 according to some embodiments, since the one or more outlet passages 110 are less in number than the plurality of cooling passages 60, in terms of management of the flow rate of the cooling air CA, it is possible to reduce the portion where accuracy of the flow passage cross-sectional area, that is, dimension accuracy of the passage should be ensured, and to suppress the production cost of the segment body 51.

With the production method for the segment body 51 according to some embodiments, since the outlet passage 110 is formed such that the flow passage cross-sectional area reduced portion 113 has the minimum flow passage cross-sectional area in the outlet passage 110, in terms of management of the flow rate of the cooling air CA, it is only necessary to manage dimension accuracy of the most downstream region in the flow passage cross-sectional area reduced portion 113. Thus, it is possible to narrow the region where accuracy of the flow passage cross-sectional area, that is, dimension accuracy of the passage should be ensured, and to suppress the production cost of the segment body 51.

With the production method for the segment body 51 according to some embodiments, it is possible to suppress the production cost of the segment body 51, as compared to a case where the outlet passage 110 is formed by machining alone. Moreover, with the production method for the segment body 51 according to some embodiments, it is possible to improve dimension accuracy of the inner wall surface 110c of the outlet passage 110 and to improve control accuracy of the flow rate of the cooling air CA, as compared to a case where the outlet passage 110 is formed by the metal additive manufacturing method or the precision casting method alone. Furthermore, with the production method for the segment body 51 according to some embodiments, it is possible to adjust the dimension of the inner wall surface 110c of the outlet passage 110 while checking the flow rate of the cooling air CA, making it possible to suppress excess or deficiency of the flow rate of the cooling air CA.

With the production method for the segment body 51 according to some embodiments, since it is possible to define the dimension of the inner wall surface 110c of the outlet passage 110, or more specifically, an inner diameter Di of the minimum flow passage cross-sectional area portion 117 by the diameter Dd of the triangular drill 19, the segment body 51 is easily produced.

Performing the production method for the segment body 51 according to some embodiments, it is possible to control the flow rate of the cooling air CA in the segment body 51. That is, a flow rate control method for the cooling air CA in the segment body 51 according to some embodiments described above includes the cooling passage forming step S10, the header forming step S20, the outlet passage forming step S30, and the outlet passage cutting step S40.

With the flow rate control method for the cooling air CA according to some embodiments, since it is possible to define the dimension of the inner wall surface 110c of the outlet passage 110 (the inner diameter Di of the minimum flow passage cross-sectional area portion 117) by the diameter Dd of the triangular drill 19, the flow rate of the cooling air CA is easily controlled. Therefore, it is possible to easily avoid deficiency in cooling capacity while suppressing excess cooling.

In the flow rate control method for the cooling air CA according to some embodiments, the cooling passage forming step S10 includes forming the cooling passages 60 included in each of the plurality of cooling passage groups 6.

Moreover, in the flow rate control method for the cooling air CA according to some embodiments, the header forming step S20 includes forming the headers 80 included in each of the plurality of cooling passage groups 6.

In the flow rate control method for the cooling air CA according to some embodiments, the outlet passage forming step S30 includes forming the outlet passages 110 included in each of the plurality of cooling passage groups 6.

In the flow rate control method for the cooling air CA according to some embodiments, the outlet passage cutting step S40 includes cutting, with the triangular drill 19, the outlet passages 110 included in each of the plurality of cooling passage groups 6.

Thus, it is possible to define the dimension of the inner wall surface 110c of each outlet passage 110 (the inner diameter Di of the minimum flow passage cross-sectional area portion 117) by the diameter Dd of the triangular drill 19, the variation in flow rate of the cooling air CA among the plurality of cooling passage groups 6 is easily suppressed.

The present invention is not limited to the above-described embodiments, and also includes an embodiment obtained by modifying the above-described embodiments and an embodiment obtained by combining these embodiments as appropriate.

For example, in some embodiments described above, the description has been given by taking the ring segment 50 as an example of the high-temperature component which needs to be cooled by the cooling medium. However, the present invention is not limited thereto, but is also applicable to the other high-temperature components such as the combustor 12, the rotor blade 41 (such as the platform 45), the stator vane 21 (such as the inner shroud 25 and the outer shroud 27), and the like. Moreover, the high-temperature component applicable to the present invention is not limited to the constituent components in the gas turbine 10, but may be constituent components in a turbomachinery other than the gas turbine 10.

REFERENCE SIGNS LIST

6 Cooling passage group
10 Gas turbine
12 Combustor
13 Turbine
21 Turbine stator vane (stator vane)
41 Turbine rotor blade (rotor blade)
50 Ring segment
51 Segment body
52 Body
52b Outer surface (surface to be heated)
60 Axial passage (cooling passage)
63 Branch flow passage
65 Downstream end
67 Connection
70 Partition wall
80 Header
81 Upstream inner wall
82 Downstream inner wall
110 Outlet passage
111 Upstream region
113 Flow passage cross-sectional area reduced portion
115 Downstream region
117 Minimum flow passage cross-sectional area portion

The invention claimed is:

1. A high-temperature component which is used for a turbomachinery and needs to be cooled by a cooling medium, the component comprising:
a plurality of cooling passages through which the cooling medium can flow;
a header connected to respective downstream ends of the plurality of cooling passages; and
one or more outlet passages for discharging the cooling medium flowing into the header to outside of the header,
wherein the one or more outlet passages are less in number than the plurality of cooling passages,
wherein respective minimum flow passage cross-sectional areas of the one or more outlet passages are not less than respective flow passage cross-sectional areas of the plurality of cooling passages in a connection between the header and the cooling passages,
wherein a sum of the respective minimum flow passage cross-sectional areas of the one or more outlet passages is less than a sum of the respective flow passage cross-sectional areas of the plurality of cooling passages in the connection between the header and the cooling passages,
wherein the one or more outlet passages each have an inner wall surface whose center line average roughness Ra is not greater than 10 μm in a region where the flow passage cross-sectional area of the outlet passage is minimum, and
wherein the plurality of cooling passages each have an inner wall surface whose center line average roughness Ra is not less than 10 μm and not greater than 20 μm.

2. The high-temperature component according to claim 1, wherein a separation distance between an upstream inner wall and a downstream inner wall of the header is at least one time and at most three times greater than an equivalent diameter of a region where the flow passage cross-sectional area of the outlet passage is minimum.

3. The high-temperature component according to claim 1, wherein the one or more outlet passages each include a flow passage cross-sectional area reduced portion in which the flow passage cross-sectional area of the outlet passage is gradually decreased toward a downstream side.

4. The high-temperature component according to claim 1, wherein walls, respectively, forming the plurality of cooling passages have chamfered corners at downstream ends of the cooling passages.

5. The high-temperature component according to claim 1, wherein the number of outlet passages is one.

6. A high-temperature component which is used for a turbomachinery and needs to be cooled by a cooling medium, the component comprising:
a plurality of cooling passages through which the cooling medium can flow;
a header connected to respective downstream ends of the plurality of cooling passages; and one or more outlet passages for discharging the cooling medium flowing into the header to outside of the header,
wherein the one or more outlet passages are less in number than the plurality of cooling passages,
wherein respective minimum flow passage cross-sectional areas of the one or more outlet passages are not less than respective flow passage cross-sectional areas of the plurality of cooling passages in a connection between the header and the cooling passages,
wherein a sum of the respective minimum flow passage cross-sectional areas of the one or more outlet passages is less than a sum of the respective flow passage cross-sectional areas of the plurality of cooling passages in the connection between the header and the cooling passages,
wherein the high-temperature component is ring segments of a gas turbine which are, respectively, constituted by a plurality of segment bodies annularly formed along a circumferential direction,
wherein the plurality of segment bodies each have an inner surface facing a combustion gas flow path through which a combustion gas flows,
wherein the plurality of cooling passages are formed in the plurality of segment bodies, respectively, and
wherein the one or more outlet passages open into the combustion gas at respective downstream ends of the plurality of segment bodies in an axial direction.

7. The high-temperature component according to claim 6, wherein a separation distance between an upstream inner wall and a downstream inner wall of the header is at least one time and at most three times greater than an equivalent diameter of a region where the flow passage cross-sectional area of the outlet passage is minimum.

8. The high-temperature component according to claim 6, wherein the one or more outlet passages each include a flow passage cross-sectional area reduced portion in which the flow passage cross-sectional area of the outlet passage is gradually decreased toward a downstream side.

9. The high-temperature component according to claim 6, wherein walls, respectively, forming the plurality of cooling passages have chamfered corners at downstream ends of the cooling passages.

10. The high-temperature component according to claim 6, wherein the number of outlet passages is one.

11. A high-temperature component which is used for a turbomachinery and needs to be cooled by a cooling medium, the component comprising:
a plurality of cooling passages through which the cooling medium can flow;
a header connected to respective downstream ends of the plurality of cooling passages; and
one or more outlet passages for discharging the cooling medium flowing into the header to outside of the header,
wherein the plurality of cooing passages each have a longer length dimension than the header,
wherein the one or more outlet passages are less in number than the plurality of cooling passages,
wherein respective minimum flow passage cross-sectional areas of the one or more outlet passages are not less than respective flow passage cross-sectional areas of the plurality of cooling passages in a connection between the header and the cooling passages, and
wherein a sum of the respective minimum flow passage cross-sectional areas of the one or more outlet passages is less than a sum of the respective flow passage cross-sectional areas of the plurality of cooling passages in the connection between the header and the cooling passages.

12. A production method for a high-temperature component which is used for a turbomachinery and needs to be cooled by a cooling medium, the method comprising:
a step of forming a plurality of cooling passages through which the cooling medium can flow;
a step of forming a header connected to respective downstream ends of the plurality of cooling passages; and
a step of forming one or more outlet passages for discharging the cooling medium flowing into the header to outside of the header,
wherein the plurality of cooing passages each have a longer length dimension than the header,
wherein the one or more outlet passages are less in number than the plurality of cooling passages,
wherein respective minimum flow passage cross-sectional areas of the one or more outlet passages are not less than respective flow passage cross-sectional areas of the plurality of cooling passages in a connection between the header and the cooling passages, and
wherein a sum of the respective minimum flow passage cross-sectional areas of the one or more outlet passages is less than a sum of the respective flow passage cross-sectional areas of the plurality of cooling passages in the connection between the header and the cooling passages.

13. The production method for the high-temperature component according to claim 12,
wherein the step of forming the one or more outlet passages includes forming the one or more outlet passages to each include a flow passage cross-sectional area reduced portion in which the flow passage cross-sectional area of the outlet passage is gradually decreased toward a downstream side.

14. The production method for the high-temperature component according to claim 12,
wherein the step of forming the one or more outlet passages includes forming the one or more outlet passages by a metal additive manufacturing method or a precision casting method, and
wherein the method further comprises a step of performing machining on at least a part of an inner wall surface of each of the one or more outlet passages.

15. The production method for the high-temperature component according to claim 14,
wherein the step of performing machining includes cutting the one or more outlet passages with a drill.

16. A flow rate control method for a cooling medium that flows inside a high-temperature component which is used for a turbomachinery and needs to be cooled by the cooling medium, the method comprising:
a step of forming a plurality of cooling passages through which the cooling medium can flow;
a step of forming a header connected to respective downstream ends of the plurality of cooling passages;
a step of forming, by a metal additive manufacturing method or a precision casting method, one or more outlet passages for discharging the cooling medium flowing into the header to outside of the header; and
a step of cutting the one or more outlet passages with a drill, wherein the step of cutting the one or more outlet passages with a drill includes a step of adjusting a dimension of an inner wall surface of each of the one or more outlet passages while checking a flow rate of the cooling medium.

17. The flow rate control method according to claim 16,
wherein the high-temperature component includes a plurality of cooling passage groups each including the one header, at least two of the cooling passages connected at respective downstream ends to the header, and the one or more outlet passages connected to the header,
wherein the step of forming the plurality of cooling passages includes forming the cooling passages included in each of the plurality of cooling passage groups,
wherein the step of forming the header includes forming the header included in each of the plurality of cooling passage groups,
wherein the step of forming the one or more outlet passages includes forming the outlet passages included in each of the plurality of cooling passage groups, and,
wherein the step of cutting the one or more outlet passages with the drill includes cutting, with the drill, the outlet passages included in each of the plurality of cooling passage groups.

\* \* \* \* \*